United States Patent [19]

De Marco et al.

[11] Patent Number: 4,805,051

[45] Date of Patent: Feb. 14, 1989

[54] APPARATUS FOR RECORDING AND REPRODUCING DATA ON A MAGNETIC RECORDING MEDIUM

[75] Inventors: Giuliano De Marco; Alessandro Fehl, both of Ivrea, Italy

[73] Assignee: Ing. C. Olivetti & C., S.p.A., Ivrea, Italy

[21] Appl. No.: 142,273

[22] Filed: Jan. 4, 1988

Related U.S. Application Data

[63] Continuation of Ser. No. 798,623, Nov. 15, 1985, abandoned.

[30] Foreign Application Priority Data

Nov. 15, 1984 [IT] Italy ................................ 68144 A/84

[51] Int. Cl.⁴ .......................... G11B 21/08; G11B 5/09; G11B 5/265
[52] U.S. Cl. ................................ 360/78.01; 360/48; 360/121
[58] Field of Search ............................. 360/78, 48, 121

[56] References Cited

U.S. PATENT DOCUMENTS

| 4,068,268 | 1/1978 | Idemoto et al. | 360/77 |
| 4,298,897 | 11/1981 | Arter et al. | 360/63 |
| 4,622,601 | 11/1986 | Isozaki et al. | 360/118 |

FOREIGN PATENT DOCUMENTS

| 0026320 | 8/1980 | European Pat. Off. |
| 0052477 | 11/1981 | European Pat. Off. |
| 0110050 | 9/1983 | European Pat. Off. |

OTHER PUBLICATIONS

Patent Abstracts of Japan, vol. 7, No. 176 (P-214).
IBM Technical Disclosure Bulletin, vol. 26, No. 1, Jun. 1983, p. 406.
IBM Technical Disclosure Bulletin, vol. 27, No. 9, Feb. 1985, pp. 5258-5260.

Primary Examiner—Vincent P. Canney
Attorney, Agent, or Firm—Banner, Birch, McKie & Beckett

[57] ABSTRACT

Apparatus for recording and reproducing data on a magnetic recording medium (27) having a plurality of recording tracks (29) comprises a magnetic head (32) and a mechanism which selectively positions the head (32) with respect to the tracks (29) of the magnetic medium (27). The head has at least two gaps which are of different widths and which can be selected one at a time for reading and/or recording data on the magnetic recording medium (27). A control circuit controls the positioning mechanism to move the head with respect to the magnetic recording medium by a distance which depends on the gap selected. The packing density of tracks on the recording medium determines which gap is selected for use.

10 Claims, 4 Drawing Sheets

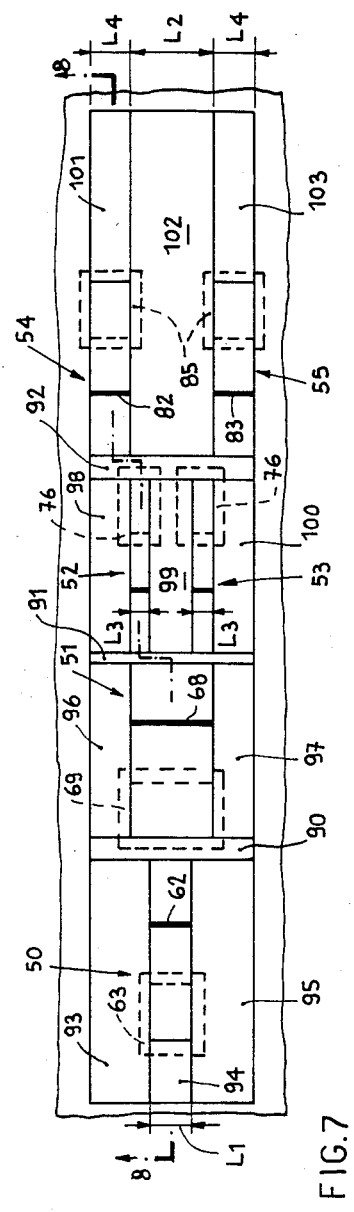
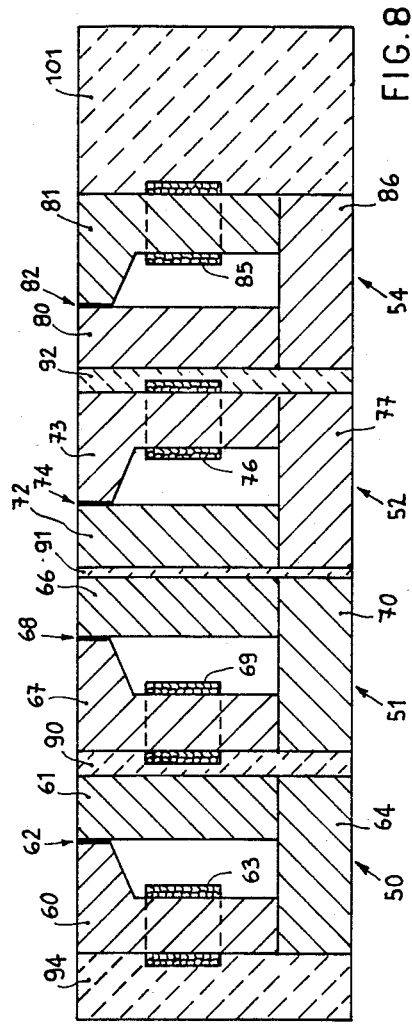
FIG.7
FIG.8

APPARATUS FOR RECORDING AND REPRODUCING DATA ON A MAGNETIC RECORDING MEDIUM

This application is a continuation of application Ser. No. 798,623, filed Nov. 15, 1985, now abandoned.

BACKGROUND OF THE INVENTION

The present invention relates to apparatus for recording and reproducing data on a magnetic recording medium, for example a disk or a tape, having a plurality of recording tracks, which are concentric in the case of a disk and parallel in the case of a tape.

The apparatus is of the type that comprises at least one magnetic head and a mechanism for positioning the head with respect to the tracks of the magnetic recording medium.

In known apparatus for recording and reproducing data, each magnetic head is provided either with a single gap for recording and reading the information concerned ("single gap" type), or with two independent gaps, one for recording and one for reading ("read after write" type), disposed in such a way that they are both transverse to the longitudinal axis of the recording track and centered on the axis. In both types, erasing gaps may be disposed at the sides of the recording gap for "cleaning up" the recording signal thereby defining a recording "tunnel".

The width of the recording gap of the head is normally a little smaller than the width of the track of the magnetic recording medium. The width of the tracks determines the packing density of tracks, normally expressed in tracks per inch (t.p.i.).

In the case of magnetic disks of flexible type, which are commercially known by the term "floppy disk", standardised packing densities have been adopted by most manufacturers, so as to make the various items of equipment interchangeable with each other. A very wide-spread packing density is 48 t.p.i. In order to increase the capacity of each individual disk, the packing density has been raised to 96 t.p.i., with a consequential reduction in the width of each track.

The magnetic heads used for reading magnetic recording media with a packing density of 48 t.p.i. have recording and reading gaps of about 317 $\mu$m wide, with at the sides, two erasing gaps which are each about 150 $\mu$m in width. The magnetic heads which are used for reading magnetic recording media with the packing density of 96 t.p.i. however have reading and recording gaps about 159 $\mu$m wide with, at the sides, two erasing gaps which are each about 80 $\mu$m in width.

The mechanisms for positioning the head with respect to the disk are therefore controlled in such a way as to move the head by distances which are linked to the packing density. That means that, in the apparatuses for handling disks with a packing density of 48 t.p.i., the stepping movement of the head is over a distance of 529 $\mu$m, while in the case of apparatus for dealing with disks with a packing density of 96 t.p.i., the stepping movement of the head is 264.5 $\mu$m.

It will be apparent that pre-recorded disks with a packing density of 48 t.p.i. can also be read by apparatus or equipment which have heads and positioning mechanisms that are suitable for handling disks with a packing density of 96 t.p.i., the signal which is prerecorded on a 48 t.p.i. disk being sufficiently wide and strong to be read by the head of the equipment for dealing with 96 t.p.i. disks. However, such 48 t.p.i. disks cannot be recorded by the equipment for dealing with 96 t.p.i. disks and then transferred back into a piece of equipment with 48 t.p.i. disks. The latter would no longer be capable of reading such disks, the signal recorded with a head of the 96 t.p.i. apparatus being too narrow and weak to be correctly read by a head of an apparatus for dealing with 49 t.p.i. disks.

SUMMARY OF THE INVENTION

It is an object of the invention to provide apparatus which is capable of dealing equally well with magnetic recording media which have different recording track packing densities from each other.

Apparatus according to the invention is characterised in that the magnetic head comprises at least two recording and reading gaps, that the gaps are of different widths and that switching means are operable to activate the recording and reading gaps one at a time.

BRIEF DESCRIPTION OF THE DRAWING

The invention will now be described in more detail, by way of example, and with reference to the accompanying drawings, in which:

FIG. 7 is a plan view of the magnetic head shown in FIG. 6, FIG. 8 is a view in section taken along line 8—8 in FIG. 7.

DESCRIPTION OF THE PREFERRED EMBODIMENT

Figure 1:
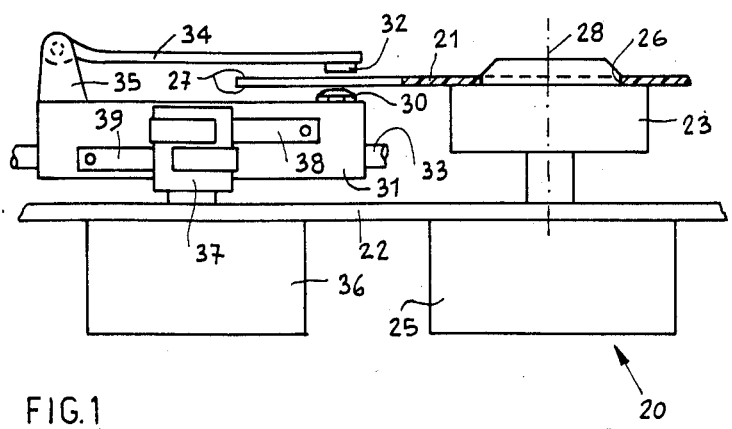
FIG. 1 is a side view of an apparatus according to the invention.
Figure 2:
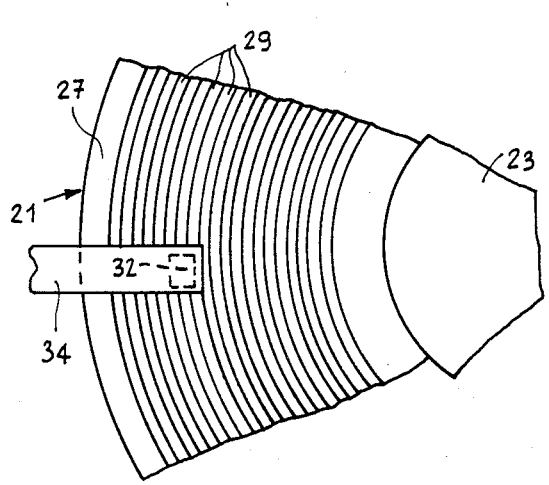
FIG. 2 is a plan view of part of the apparatus shown in FIG. 1.

Referring to FIG. 1, apparatus 20 for recording and reproducing data on a magnetic recording medium 21 comprises a base 22 on which a spindle 23 is rotatably mounted. The spindle 23 is rotated by an electric motor 25 which is fixed to the base 22. The magnetic recording medium 21 is in the form of a disk of flexible type, having a central hole 26 by means of which it can be engaged with the spindle 23 to be driven in rotation. The disk 21 is provided with two magnetised surfaces 27 on each of which is disposed a plurality of recording tracks 29 (see FIG. 2) concentric with respect to the axis of rotation 28 of the disk 21.

A first magnetic head 30 (see FIG. 1) for recording and reading data on the underneath surface of the magnetic disk 21 is mounted on a carriage 31 which is movable with respect to the base 22 under the influence of guides 33. A second magnetic head 32 is mounted at the end of an arm 34 which is pivotally mounted on a lug 35 on the carriage 31, and is disposed opposite the head 30, for recording and reading data on the upper surface of the magnetic disk 21. An electric stepping motor 36, which is fixed to the base 22, is provided for controlling the movement of the carriage 31 and movement of the heads 30 and 32 radially with respect to the magnetic disk 1, by means of a cylindrical hub 37 and a pair of flexible blades 38 and 39 of known type, for example of the type described in the U.S. Pat. No. 4,476,508.

Figure 3:
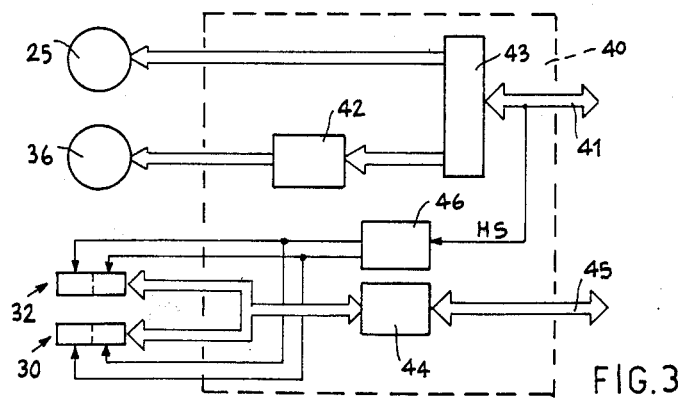
FIG. 3 is a block circuit diagram illustrating the control members of the apparatus according to the invention.

An electronic control circuit 40 (see FIG. 3) is capable of controlling the electric motors 25 and 36 and governing the flow of data from and to the magnetic heads 30 and 32, on the basis of control data which reach it on a channel 41 from a user unit to which the apparatus 20 may be connected. The user unit is not shown in the drawings and may be for example a processor.

The circuit 40 comprises a translator 42 for the stepping motor 36, a logic unit 43 which distributes the instructions which arrive from the channel 41 to the motor 25 and to the translator 42, and a circuit 44 for amplifying the recording and reading signals, being connected to both the heads 30 and 32 and, by way of a channel 45, to the unit to which the apparatus 20 is connected. The circuit 40 comprises switching means 46 which comprise for example a diverter and which are operable to select activation of the recording and reading cores of the magnetic heads 30 and 32, as will be described in greater detail hereinafter, on the basis of a control signal HS which arrives on the channel 41 from the unit using the apparatus 20.

Figure 6:
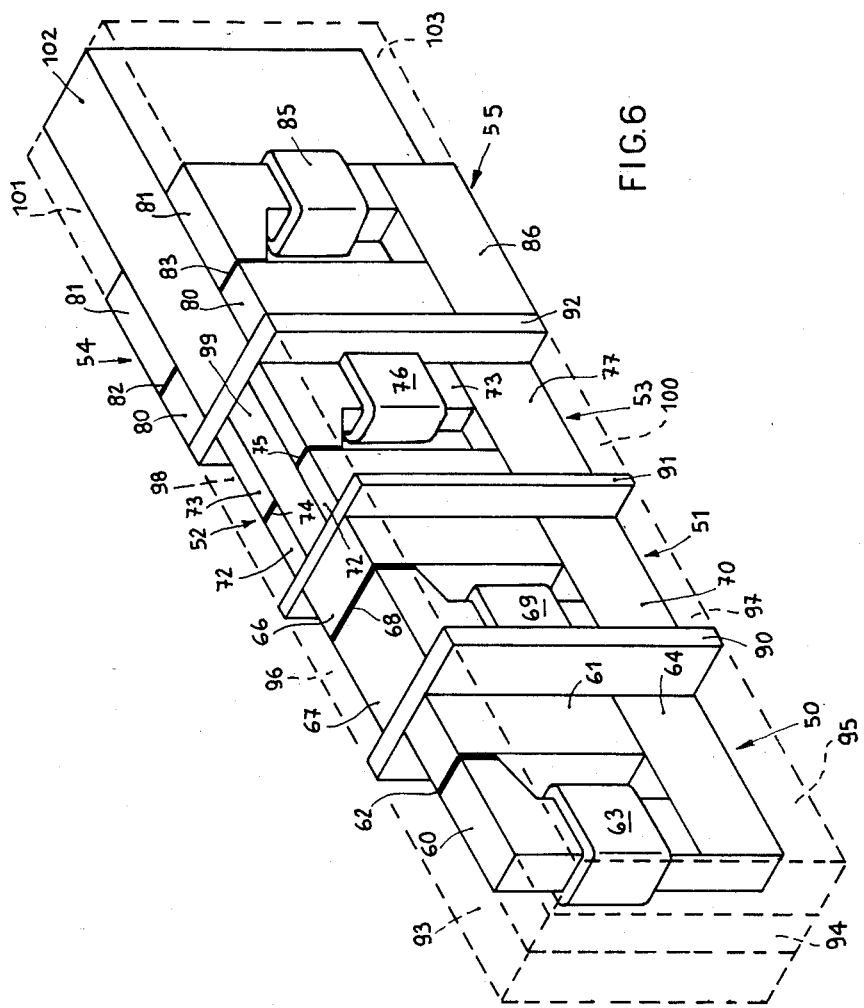
FIG. 6 is a perspective view of a magnetic head of the apparatus shown in FIG. 1.

Each magnetic head 30 and 32 comprises a first magnetic recording and reading core 50 (see FIGS. 6, 7 and 8), a second magnetic recording and reading core 51, and four magnetic erasing cores 52, 53, 54 and 55. The magnetic core 50 is formed by two shaped portions 60 and 61 which are coupled together to define a gap 62 of a predetermined width $L_1$. A coil 62 is wound in turns around the portion 60 and an element 64 closes the magnetic circuit between the portions 60 and 61.

The magnetic core 51 is formed by two shaped portions 66 and 67 which are coupled together in such a way as to define a gap 68 of a predetermined width $L_2$. A coil 69 is wound in turns around the portion 67 and an element 70 closes the magnetic circuit between the portions 66 and 67.

The magnetic cores 52 and 53 each comprise two shaped portions 72 and 73 which are coupled together to define gaps 74 and 75 respectively, of a predetermined width $L_3$. Each core 52 and 53 further comprises a coil 76 which is wound in turns around the portion 73 and an element 77 which connects the portions 72 and 73 together to close the magnetic circuit.

The magnetic cores 54 and 55 each comprise two shaped portions 80 and 81 which are connected together in such a way as to define respective gaps 82 and 83 of a predetermined width $L_4$. Each core 54 and 55 further comprises a coil 85 wound in turns around the portion 81, and an element 86 which connects the portions 80 and 81 together to close the magnetic circuit.

The portions 60, 61, 66, 67, 72, 73, 80 and 81 and the elements 64, 70, 77 and 86 are all of ferromagnetic material, for example Mn-Zn ferrite.

A first ceramic shield 90 is interposed between the core 50 and the core 51, a second ceramic shield 91 is interposed between the core 51 and the cores 52 and 53 and a third ceramic shield 92 is interposed between the cores 52 and 53 and the cores 54 and 55. A plurality of elements 93 to 103, all ceramic, complete the magnetic heads 30 and 32.

The widths $L_1$, $L_2$, $L_3$ and $L_4$ of the gaps 62, 68, 74, 75, 82 and 83 are determined in dependence on the width of the recording tracks on the magnetic recording medium which is to be used.

Figure 4:
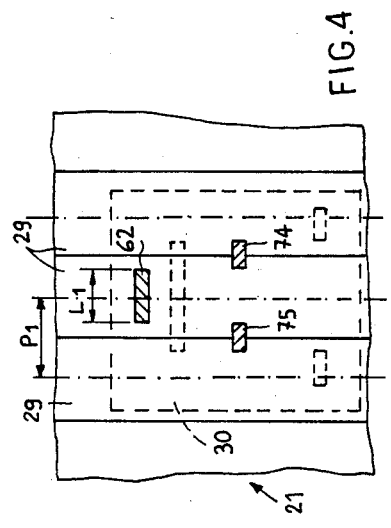
FIG. 4 is a view of a detail on an enlarged scale of a magnetic recording medium which is handled by the apparatus according to the invention, in a first working condition.
Figure 5:
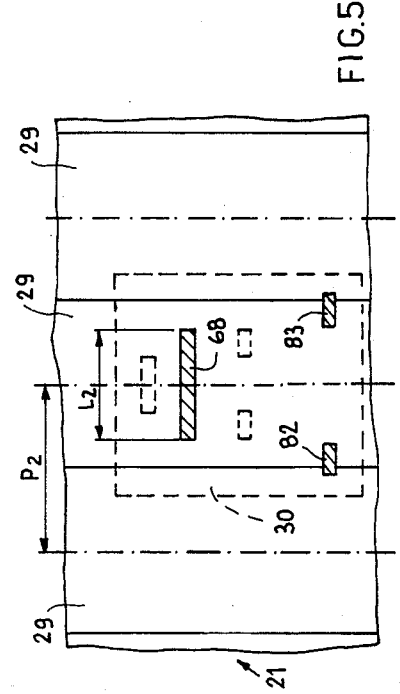
FIG. 5 is another view of a detail on an enlarged scale of a magnetic recording medium handled by the apparatus according to the invention, in another working condition.

In the case of flexibile magnetic disks with a standardised or normal packing density ($I_S$) of 48 t.p.i., the pitch or centre-to-centre spacing $P_2$ (see FIG. 5) between the tracks 29 is 529 $\mu$m while in the case of a high packing density ($I_H$) of 96 t.p.i., the pitch or centre-to-centre spacing $P_1$ (FIG. 4) between the tracks is 264.5 $\mu$m.

In order to be able to record and reproduce data on a magnetic recording medium of these types, the following gap widths are used:

$L_1 = 159$ $\mu$m; $L_2 = 317$ $\mu$m; $L_3 = 79$ $\mu$m; and $L_4 = 152$ $\mu$m.

Figure 9:
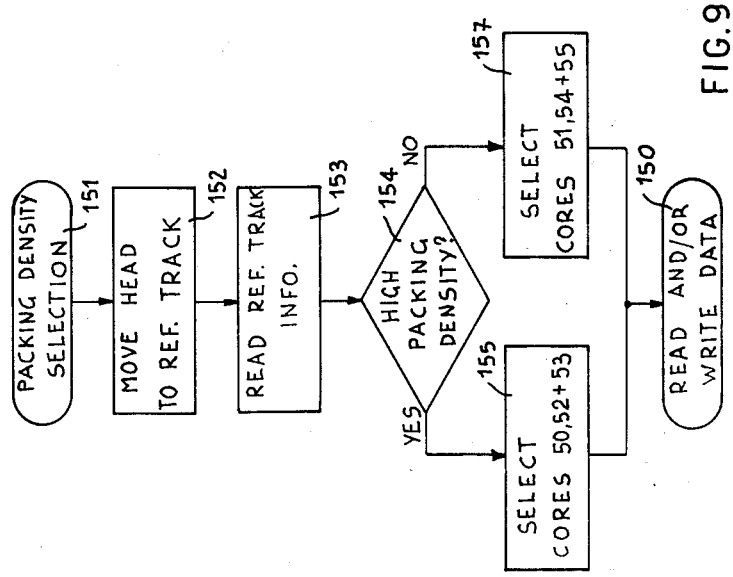
FIG. 9 is a flow diagram of the operations which are carried out for selecting the packing density of the data on the magnetic recording medium being handled by the apparatus.

Operation of the apparatus described above is as follows:

The magnetic disk 21 on which data is to be recorded or from which data is to be read is mounted on the spindle 23 and centered with respect to the axis of rotation 28. The control circuit 40 activates the motor 25 to rotate the disk 21. Before recording and/or reading data, on the basis of instructions which arrive from the user unit by means of the channel 41, (the operation 150 of FIG. 9) it performs the operation 151 for selecting the packing density.

To carry out the selection operation 151, the control circuit 40 activates the stepping motor 36 so as to bring the head 30 into register with a reference track, for example the most outward of the tracks 29 (operation 152). The items of information which are pre-recorded on the reference track are then read (operation 153). Operation 154 determines whether or not the disk 21 is recorded with a high packing density ($I_H$). In the affirmative, the switching means 46 select the magnetic cores 50, 52 and 53 (operation 155), while in the negative case the magnetic cores 51, 54 and 55 are selected (operation 157).

In the former situation (shown in FIG. 4), the magnetic heads 30 and 32 are enabled for reading and/or recording data by means of their cores 50 and associated gaps 62, with the erasing cores 52 and 53 and associated gaps 74 and 75 activated to "clean up" the signal while in the second situation (shown in FIG. 5) the magnetic heads 30 and 32 are enabled for reading and/or recording data by means of their cores 51 and associated gaps 68, with the erasing cores 54 and 55 and associated gaps 82 and 83 activated.

Depending on the type of preselected packing, the user unit controls the stepping motor 36 to cause it to produce stepping movements of the heads 30 and 32 equal to the pitch $P_1$ in the case of the high packing density ($I_H$) and equal to the pitch $P_2$ in the case of normal packing ($I_S$).

The user unit may also determine the packing density with which data are recorded by controlling the apparatus 20 by means of the head selection signal HS.

It will be apparent from the foregoing that the apparatus according to the invention is capable of recording and reading magnetic disks with different radial packing densities, because each magnetic head comprises at least two reading and recording gaps of different widths, and switching means are operable for selectivity activating the gaps one at a time.

The apparatus described above can be adapted for use with other types of recording media such as magnetic tape, magnetic cards or the like. Each head 30 and 32 could have magnetic cores formed and arranged differently to the forms and arrangements described, and could also comprise other recording and reading gaps, of respective widths.

We claim:

1. An apparatus for recording and reproducing data with different track densities on a magnetic recording medium, comprising:
   a single recording head for recording and reading data on first tracks having a first track density and for recording and reading data on second tracks having a second track density smaller than said first track density;
   a head support for movably supporting said single recording head across said tracks;
   moving means selectable for moving said head support according to either one of a first spacing mode and a second spacing mode, wherein the first spacing mode provides for positioning the head support through first short steps associated to said first tracks, and wherein the second spacing mode provides for positioning the head support through second steps greater than said first steps and associated to said second tracks, respectively; and the combination comprising:
   said single recording head includes a first single recording and reading gap and a second single recording and reading gap, wherein the width of the first gap and the width of the second gap are provided for recording and reading the data of said first tracks and said second tracks, respectively;
   switching means for actuating said first single gap to record or read the data of said first tracks concurrently with the selection of said first spacing mode and for actuating the second single gap to record or read the data of said second tracks concurrently with the selection of said second spacing mode, respectively; and
   cleaning-up means for cleaning up the data of said first tracks and said second tracks, respectively, said cleaning-up means providing a first pair and a second pair of erasing gaps disposed laterally with respect to said first single and said second single gap, respectively, and wherein said first and said second erasing gaps are actuatable concurrently with a recording status of the apparatus and selection of said first and second single recording and reading gaps; and
   wherein said moving means cause the first single gap and the first pair of erasing gaps to be centered with respect to said first tracks in the first spacing mode and cause the said second single gap and the second pair of erasing gaps to be centered with respect to said second tracks in the second spacing mode, respectively.

2. An apparatus according to claim 1, wherein the first track density is twice said second track density, and wherein the width of said second single recording and reading gap is substantially twice the width of said first single recording and reading gap.

3. An apparatus according to claim 1, wherein the first and the second single gaps are centered with respect to a common axis of said single recording head and wherein the first and the second pair of erasing gaps are disposed symmetrically with respect to said common axis.

4. An apparatus according to claim 1, wherein the recording medium comprises a magnetic disk removably mounted on said apparatus, wherein said first tracks and said second tracks are disposed concentrically with a rotational axis of a double density magnetic disk and a single density magnetic disk, respectively, wherein the first tracks of said double density disk are displaced each other according to a first pitch and wherein the second tracks of said single density disk are displaced according to a second pitch which is twice said first pitch, and wherein said moving means comprise a motor having a rotor operable to move said single head transversely with respect to said first and second tracks, according to said first pitch, in said first spacing mode, and according to said second pitch, in said second spacing mode.

5. An apparatus according to claim 4, wherein said single recording head is provided to record and read data on an underneath surface of said disks, and further comprising another single recording head to record and read data on an upper surface of said disks, and wherein said head support comprises an arm on which is mounted said other recording head.

6. An apparatus according to claim 4, wherein the first track density and the second track density are 96 tracks per inch and 48 tracks per inch, respectively, and wherein the width of said first single gap and said second single gap is substantially 159 um and 317 um, respectively.

7. An apparatus for recording and reproducing data with different track densities on removable magnetic recording disk, comprising:
   a single recording head for recording and reading data of first tracks on a magnetic disk of double density track and for recording and reading data of second tracks on a magnetic disk of single track density;
   a head support for movably supporting said recording head across said tracks;
   moving means selectable for moving said head support according to either one of a first spacing mode and a second spacing mode across said tracks, wherein the first spacing mode provides for positioning said head support on first positions association with said first tracks, and wherein the second spacing mode provides for positioning the head support on second positions associated with said second tracks, respectively; and the combination comprising:
   said single recording head includes a first and a second single recording and reading gap and a first and a second pair of erasing gaps disposed laterally with respect to said first single recording and reading gap and said second single recording and reading gap, respectively; and
   switching means for actuating said first single gap to record or read the data of double density track concurrently with the selection of said first spacing mode and for actuating the second single gap to record or read the data of single density track concurrently with the selection of said second spacing mode, respectively;
   wherein said moving means cause the first single gap to be centered with respect to said first tracks in the first spacing mode and cause said second single gap to be centered with respect to said second tracks in the second spacing mode, respectively;

wherein the width of the first gap and the width of the second gap is provided for recording and reading data of said first tracks and said second tracks, respectively, and wherein the width of said second single gap is substantially twice the width of said first single gap;

wherein the first and the second single gaps, are centered with respect to a common axis of said head to be centered with respect to one of said tracks, wherein said first and said second pair of erasing gaps are disposed symmetrically with respect to said common axis, and wherein said first pair and said second pair of erasing gaps are offset at a same side along said common axis with respect to said first single gap and said second single gap, respectively; and wherein said first and second pair of erasing gaps are actuatable concurrently with a recording status of the apparatus, the actuation of said first single gap and selection of said first spacing mode, and the actuation of said second single gap and the selection of said second spacing mode, respectively, for cleaning up data of said first tracks and said second tracks, respectively.

8. An apparatus according to claim 7, wherein said first and said second tracks are spaced 264.5 um and 529 um, respectively, and wherein the width of said first gap and said second gap is substantially 159 um and 317 um, respectively.

9. An apparatus according to claim 8, wherein the width of each of said first erasing gaps is 79 um and the width of each of said second erasing gaps is 152 um, respectively.

10. An apparatus according to claim 7, wherein said single recording head is provided to record and read data on an underneath surface of said disks, and further comprising another single recording head to record and read data on an upper surface of said disk, and wherein said head support comprises an arm on which is mounted said other recording head.

* * * * *